US00RE39364E

(19) United States
(12) Reissued Patent
Brandt

(10) Patent Number: US RE39,364 E
(45) Date of Reissued Patent: Oct. 31, 2006

(54) CYLINDER LOCK AND KEY

(75) Inventor: Greg N. Brandt, Overland Park, KS (US)

(73) Assignee: Stanley Security Solutions, Inc., Indianapolis, IN (US)

(21) Appl. No.: 10/721,019

(22) Filed: Nov. 24, 2003

Related U.S. Patent Documents

Reissue of:
(64) Patent No.: 5,615,566
Issued: Apr. 1, 1997
Appl. No.: 08/529,903
Filed: Sep. 18, 1995

(51) Int. Cl.
*E05B 15/00* (2006.01)

(52) U.S. Cl. ..... 70/419; 70/421; 70/493
(58) Field of Classification Search ..... 70/356–358, 70/367–369, 491–493, 495, 496, 409, 419–421
See application file for complete search history.

(56) References Cited

U.S. PATENT DOCUMENTS

| | | | | | |
|---|---|---|---|---|---|
| 1,093,817 | A | * | 4/1914 | Williams | 70/421 |
| 1,965,889 | A | * | 7/1934 | Fitz | 70/419 |
| 2,013,730 | A | * | 9/1935 | Jacobi | 70/419 |
| 2,047,966 | A | * | 7/1936 | Jacobi | 70/492 |
| 2,690,070 | A | * | 9/1954 | Spain | 70/421 |
| 3,216,230 | A | * | 11/1965 | Falk | 70/421 |
| 3,425,248 | A | * | 2/1969 | Duyal | 70/421 |
| 3,492,843 | A | * | 2/1970 | Slaybaugh et al. | 70/388 |
| 3,575,024 | A | * | 4/1971 | Schlage | 70/389 |
| 4,114,411 | A | * | 9/1978 | Schlage | 70/421 |
| 4,194,379 | A | * | 3/1980 | Dice, Sr. | 70/421 |
| 4,341,102 | A | * | 7/1982 | Ku et al. | 70/358 |
| 4,635,455 | A | * | 1/1987 | Oliver | 70/494 |
| 4,732,022 | A | * | 3/1988 | Oliver | 70/406 |
| 4,756,177 | A | * | 7/1988 | Widen | 70/493 |
| 4,823,575 | A | * | 4/1989 | Florian et al. | 70/358 |
| 5,016,455 | A | * | 5/1991 | Hennessy | 70/493 |
| 5,101,648 | A | * | 4/1992 | Kuster | 70/358 |
| 6,301,942 | B1 | * | 10/2001 | Shvarts | 70/367 |
| D462,004 | S | * | 8/2002 | Jenks | D8/343 |
| 6,477,875 | B1 | * | 11/2002 | Field et al. | 70/491 |

FOREIGN PATENT DOCUMENTS

| | | | | |
|---|---|---|---|---|
| DE | 2341659 | * | 2/1975 | 70/421 |
| DE | 2800374 | | 7/1979 | |
| DE | 2800398 | | 7/1979 | |
| DE | 2828343 | | 1/1980 | |
| FR | 504473 | * | 7/1920 | 70/421 |
| FR | 1533953 | * | 6/1968 | 70/421 |
| FR | 2388966 | * | 12/1978 | 70/419 |
| GB | 546711 | * | 7/1942 | 70/419 |
| GB | 2249127 | * | 4/1992 | 70/421 |

* cited by examiner

*Primary Examiner*—Suzanne Dino Barrett
(74) *Attorney, Agent, or Firm*—Pillsbury Winthrop Shaw Pittman LLP

(57) ABSTRACT

An improved security cylinder lock and key for operating the cylinder lock are disclosed. The cylinder lock has conventional tumbler locking structure and a secondary locking bar that operates independently of the tumblers. The secondary locking bar prevents operation of the cylinder lock until a properly configured key is placed in the keyway of the cylinder lock.

17 Claims, 3 Drawing Sheets

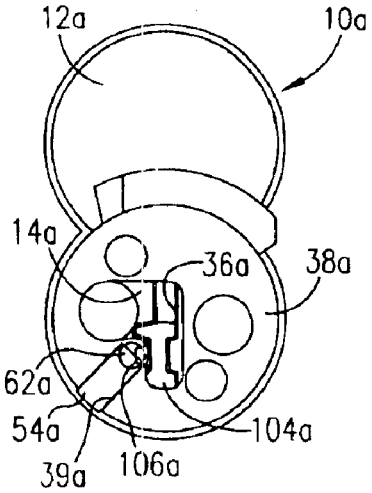
FIG. 11.
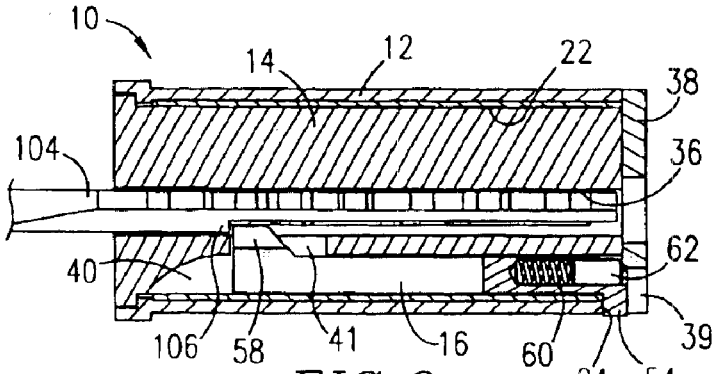
FIG. 8.
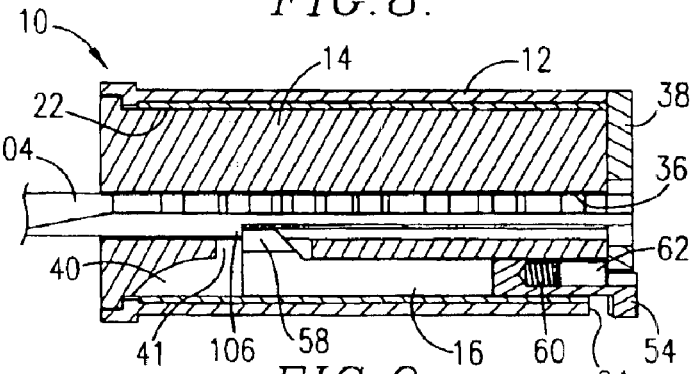
FIG. 9.
FIG. 12.
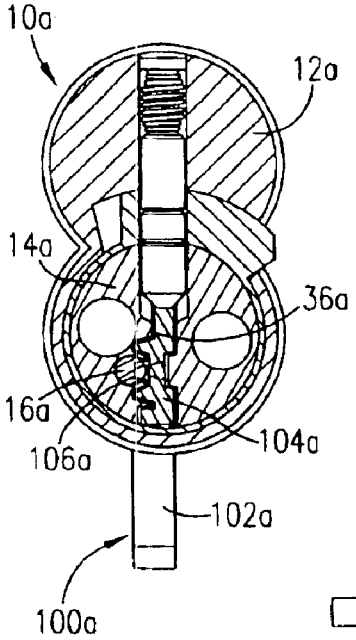
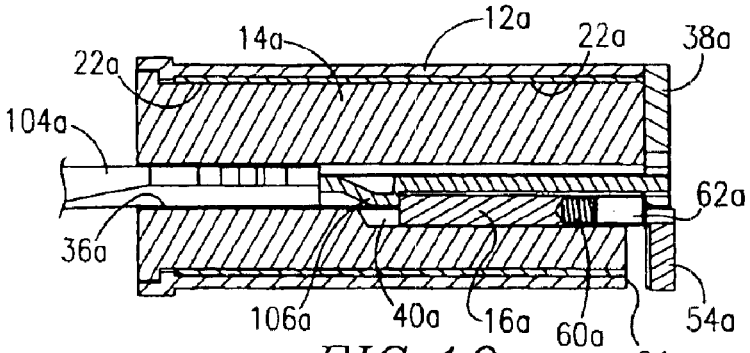
FIG. 10.
FIG. 13.
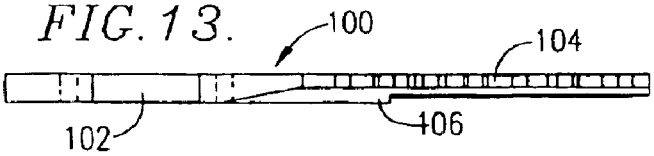
FIG. 14.
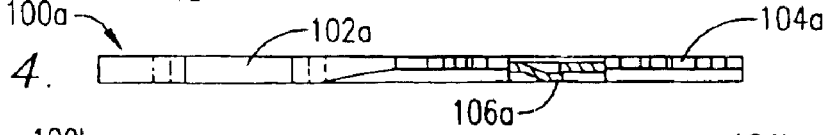
FIG. 15.
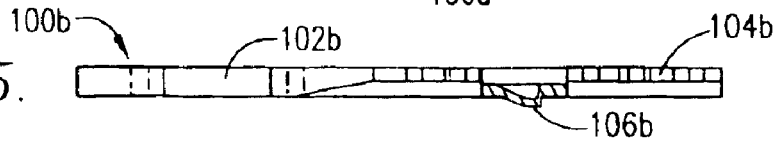

CYLINDER LOCK AND KEY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to cylinder locks, and more particularly to an improved cylinder security lock having conventional locking tumblers and secondary locking structure that operates independently of the tumblers. The secondary locking structure prevents operation of the cylinder lock until a properly configured key is placed in the keyway of the cylinder lock. The invention also relates to a novel key for operating the cylinder lock of the present invention.

2. Description of the Prior Art

Cylinder locks for locking doors, cabinets and other structures are well known in the art. These prior art cylinder locks typically include a cylinder shell, a cylinder plug rotatably received within the shell, and a plurality of tumblers reciprocally mounted in chambers extending through the shell and plug. The cylinder plug is typically coupled with a lock actuator that rotates with the plug for unlocking a locking mechanism such as a dead bolt upon rotation of the plug.

In more detail, cylinder plugs include a keyway for receiving a key blade. The tumblers are configured for preventing rotation of the cylinder plug until a properly configured key blade is inserted in the keyway. A properly configured key displaces the tumblers to a position that permits the rotation of the cylinder plug in the shell.

Although prior art cylinder locks effectively provide security when first installed, they can be circumvented shortly thereafter by unauthorized key duplication. Although it is common for companies to attempt to control access to a locked area by distributing only one key to each of their selected employees, the employees often have their keys copied by a locksmith. Thus, it is virtually impossible to control the distribution of keys that fit a particular lock since many extra keys can be cut without the knowledge or permission of the employer.

In an attempt to prevent unauthorized key duplication, many lock manufacturers repeatedly create new key blank designs and regulate the manufacture and distribution of the key blanks. However, due to the strong demand for key duplication services, locksmiths and key blank manufacturers usually gain access to these new blank designs and introduce copies of the blanks within a short time of their creation.

Another concern of lock manufacturers are the limitations in the amount of different key combinations available with any particular lock design. A common method of increasing key combinations is to produce locks and keys with different key blade shapes that are non-interchangeable thus increasing the number of useable different keys with essentially the same basic lock design. However, these keys still offer no protection against unauthorized duplication.

OBJECTS AND SUMMARY OF THE INVENTION

In view of the limitations of prior art cylinder locks discussed above, it is an object of the present invention to provide an improved cylinder lock that cannot be easily circumvented by unauthorized key duplication.

It is a more particular object of the present invention to provide a cylinder lock with secondary locking structure that operates independently of the lock's tumblers for preventing operation of the cylinder lock until a properly configured key is placed in the keyway of the cylinder lock.

It is another object of the present invention to provide a cylinder lock with secondary locking structure that is simple and inexpensive to manufacture.

It is another object of the present invention to provide a cylinder lock having a secondary locking structure that can be easily formed in various sizes and shapes to accommodate a plurality of key blanks in a single keyway, thus substantially increasing the key combination per keyway.

It is another object of the present invention to provide a novel key having utilitarian structure for operating the cylinder lock of the present invention.

In view of these objects and other objects that become evident from the following description of the preferred embodiments of the invention, an improved cylinder lock and key for operating the cylinder lock are provided. The preferred cylinder lock broadly includes a lock shell, a cylinder plug rotatably positioned in the lock shell, and a secondary locking structure including a locking bar positioned in the cylinder plug that operates independently of the lock's tumblers.

The secondary locking structure prevents rotation of the cylinder plug relative to the cylinder shell until a properly configured key is fully inserted in the keyway. If a key is cut by conventional means so that it operates the tumblers of the cylinder lock but does not properly operate the secondary locking structure, it will not open the cylinder lock.

The preferred secondary locking structure broadly includes a locking bar that is reciprocally mounted in a hollow slot formed in the cylinder plug parallel to the keyway. The locking bar includes a finger portion that is normally engaged within a notch formed in the rear face of the cylinder shell. When a properly configured key is placed in the keyway, it engages the locking bar and shifts it rearward so that the finger portion is shifted out of the notch formed in the shell, thus permitting rotation of the cylinder plug relative to the shell.

The key of the present invention includes structure for operating the cylinder lock described herein. In preferred forms, the key includes a stamped lug protruding from one side thereof for engaging the locking bar and shifting the finger portion out of the notch formed in the cylinder shell when the key is fully inserted in the keyway.

By constructing a cylinder lock and associated key as described above, numerous advantages are realized. For example, by constructing a cylinder lock that includes secondary locking structure that operates independently of the lock's tumblers, a key blank that is merely copied to fit the lock's tumblers will not open the lock. Thus, the cylinder lock cannot be easily circumvented by unauthorized key duplication.

Additionally, since the secondary locking structure includes only a slot formed in the plug of the lock and a locking bar that is positioned in the slot, it is simple and inexpensive to manufacture. Moreover, existing cylinder lock designs can be easily modified to include the secondary locking structure of the present invention.

Another advantage of the present invention is that since the key itself includes novel utilitarian structure for operating the cylinder lock of the present invention, it provides a second layer of protection against unauthorized key duplication.

Another advantage of the present invention is that the locking bar can be varied in size to cooperate with a plurality of novel key blanks without changing the shape of the keyway. This reduces the cost associated with forming new keyways for various cylinder locks and significantly increases the number of keying combinations per keyway.

BRIEF DESCRIPTION OF THE DRAWING FIGURES

A preferred embodiment of the present invention is described in detail below with reference to the attached drawing figures, wherein:

FIG. 8 is a side sectional view of the cylinder lock illustrated in FIG. 2 depicting the secondary locking structure in the locked position with the key not completely inserted;

FIG. 9 is a side sectional view of the cylinder lock depicting the secondary locking structure shifted to the unlocked position;

FIG. 10 is a side sectional view of a cylinder lock constructed in accordance with a second embodiment of the invention depicting the secondary locking structure shifted to the unlocked position;

FIG. 11 is an end view of the cylinder lock of the second embodiment of the invention;

FIG. 12 is an end sectional view of the cylinder lock illustrated in FIG. 11;

FIG. 13 is a top view of the key constructed in accordance with a first embodiment;

FIG. 14 is a top view of the key constructed in accordance with a second embodiment;

FIG. 15 is a top view of the key constructed in accordance with a third embodiment;

DETAILED DESCRIPTION OF THE PREFERRED EMBODIMENTS

Figure 1:
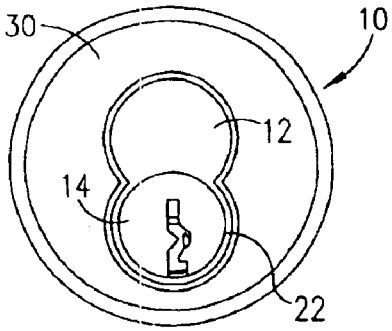
FIG. 1 is a front view of a cylinder lock constructed in accordance with a first embodiment of the present invention shown installed in an outer cylinder housing.

Turning now to the drawing figures, and particularly FIG. 1, a cylinder lock 10 constructed in accordance with a first embodiment of the invention is illustrated. The cylinder lock 10 broadly includes a lock shell 12, a cylinder plug 14 rotatably positioned in the lock shell 12, and secondary locking structure including a locking bar 16 depicted in FIG. 4 that operates independently of the lock's conventional tumblers. All of the components of the cylinder lock 10 are preferably formed of metal materials such as brass alloys.

Figure 3:
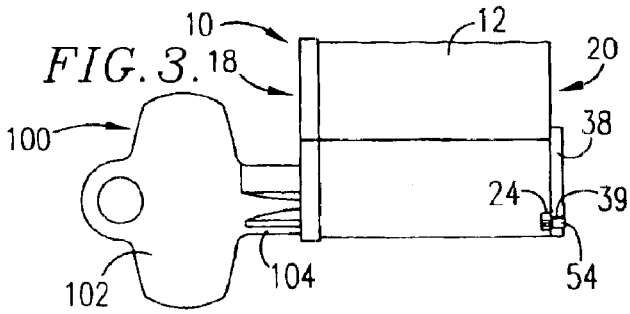
FIG. 3 is a side elevational view of the cylinder lock and the key of FIG. 2, depicting the key inserted into the cylinder lock keyway.
Figure 2:
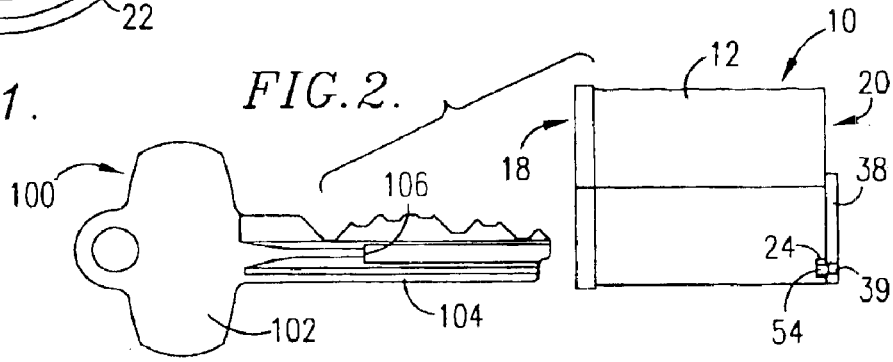
FIG. 2 is a side elevational view of the cylinder lock of the present invention shown with a key constructed in accordance with a first embodiment, depicting the key before it is inserted into the cylinder lock keyway.

In more detail, the lock shell 12 is best illustrated in FIGS. 2 and 3 includes opposed axial front and rear ends 18 and 20 and a hollow plug-receiving chamber 22 extending therebetween. The rear end of the shell 12 includes a notch 24 formed near its lower edge for receiving the rear end of the locking bar 16 is described in more detail below.

Figure 4:
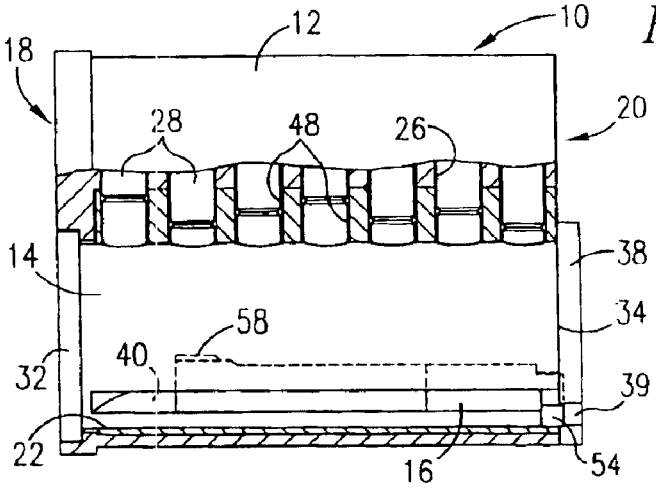
FIG. 4 is a partial side sectional view of the cylinder lock with parts broken away depicting the tumblers and secondary locking structure.
Figure 6:
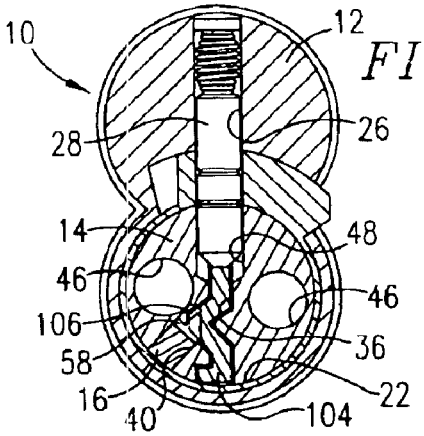
FIG. 6 is an end sectional view of the cylinder lock of FIG. 2 with the key inserted therein.

As best illustrated in FIGS. 4 and 6, the lock shell 12 also includes a plurality of tumbler-receiving chambers 26 extending transversely to its longitudinal axis. Each of the tumbler-receiving chambers 26 extends from the shell's 12 top edge into the plug-receiving chamber 22. A plurality of conventional spring-biased tumblers 28 are positioned within the tumbler-receiving chambers 26 as described in more detail below.

Returning to FIG. 1, the lock shell 12 is preferably received within an outer housing 30 that fits into a door, cabinet, or similar structure. The shape and size of the outer housing 30 can be varied to fit any type of door, cabinet, or various other applications.

The cylinder plug 14 is preferably cylindrical in shape and is rotatably received within the plug-receiving chamber 22 of the shell 12. As best illustrated in FIG. 4, the cylinder plug 14 presents opposed axial front and rear ends 32 and 34 and has a hollow keyway 36 depicted in FIG. 5 extending therebetween for receiving a key blade 104.

The cylinder plug 14 also includes a retainer cap 38 secured to its rear end 34 for retaining the cylinder plug 14 in the chamber 22. The retainer cap 38 has a diameter slightly greater than the diameter of the plug-receiving chamber 22 and includes a notch 39 formed along its circumference for permitting the locking bar 16 to slide thereby as described below.

As best illustrated in FIG. 4, the cylinder plug 14 also includes a hollow slot 40 extending parallel to the keyway 36 for receiving the blocking bar 16. In a first embodiment of the cylinder lock 10, the slot 40 runs substantially the entire length of the keyway 36 as depicted in FIGS. 8 and 9 and includes a side opening 41 in communication with the keyway 36. The side opening 41 is provided for receiving a front finger portion 58 of the locking bar 16 as described in more detail below.

A second embodiment of the cylinder lock 10a with a modified slot 40a is illustrated in FIGS. 10–12. In this embodiment, the slot 40a extends only along the rear half of the keyway 36a as depicted in FIG. 10 and has one side entirely in communication with the keyway 36a.

Referring again to FIG. 3, the rear end of the slot 40 opens into the notch 24 in the lock shell and the notch 39 formed in the retainer cap 38. The slot 40 and retainer cap notch 39 are in alignment with the lock shell notch 24 only when the cylinder plug 14 is in the locked position, i.e., when the cylinder plug 14 has not been rotated relative to the lock shell 12.

Figure 5:
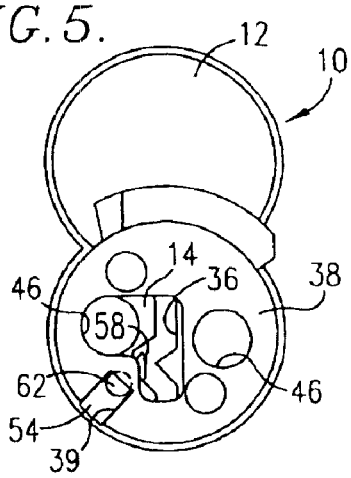
FIG. 5 is an end view of the cylinder lock of FIG. 2.

Referring to FIG. 5, the cylinder plug 14 also includes a pair of elongated orifices 46 extending parallel to and on opposite sides of the keyway 36 for receiving the arms of a lock actuator (not shown). The lock actuator rotates with the cylinder plug 14 and may be coupled with a conventional cam assembly or retracting assembly for unlocking a dead bolt or similar device upon rotation of the cylinder plug 14.

Figure 7:
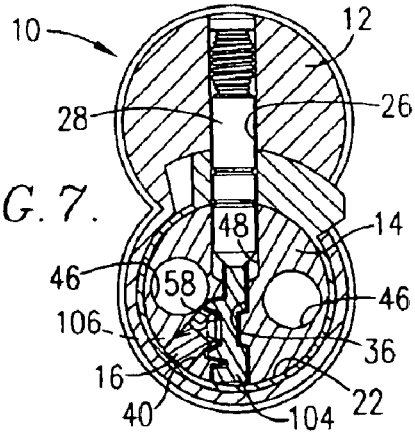
FIG. 7 is an end sectional view of the cylinder lock with a key constructed in accordance with a second embodiment inserted therein.

As best illustrated in FIGS. 4 and 6, the cylinder plug 14 also includes a plurality of tumbler-receiving chambers 48 that extend transversely to its longitudinal axis and extend into the keyway 36. The tumbler-receiving chambers 48 of the cylinder plug 14 are in alignment with the tumbler-receiving chambers 26 of the lock shell 12 when the cylinder lock 10 is in the locked position as depicted in FIGS. 6 and 7.

A plurality of conventional spring-biased tumblers 28 are positioned within the tumbler-receiving chambers 26 and 48. The tumblers 28 are configured for permitting rotation of the cylinder plug 14 within the cylinder shell 12 only when a properly configured key 100 is placed in the keyway 36 of the cylinder plug 14.

Figure 17:
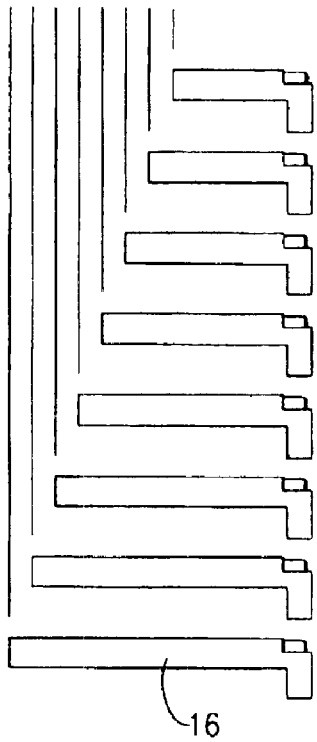
FIG. 17 is a perspective view of a locking bar constructed for use with the cylinder lock of the second embodiment of the invention.
Figure 17:
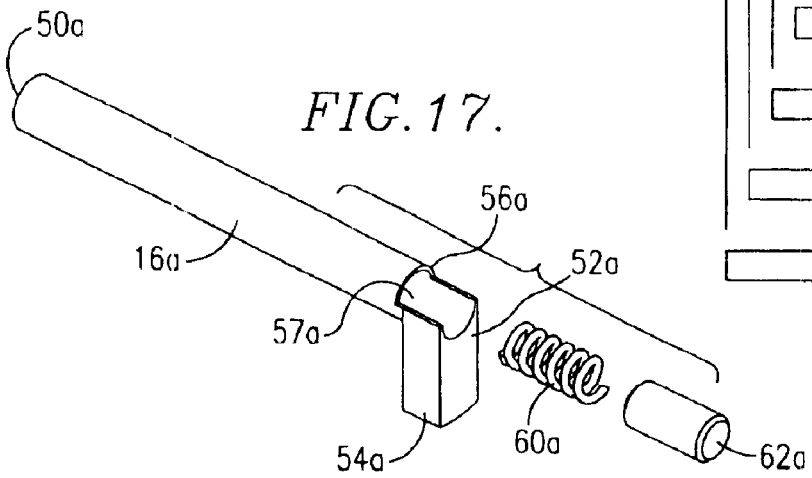
Figure 18:
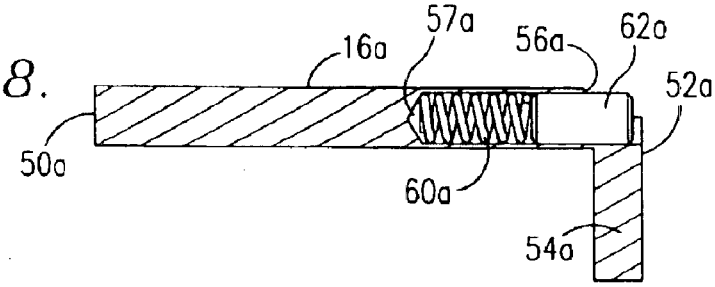
FIG. 18 is a side sectional view of the locking bar illustrated in FIG. 17.
Figure 19:
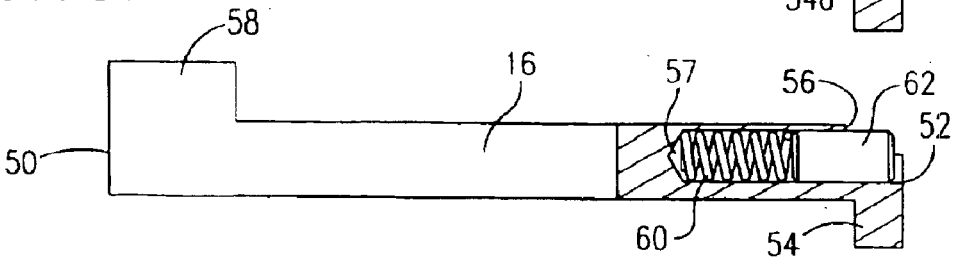
FIG. 19 is a partial side sectional view of a locking bar constructed for use with the cylinder lock of the first embodiment of the invention.

The locking bar 16 is reciprocally mounted in the hollow slot 40 of the cylinder plug 14 as depicted in FIG. 4 and provides a secondary locking structure that operates independently of the above-described tumblers 28. A first embodiment of the locking bar 16 is depicted in FIG. 19 and is configured for use with the cylinder lock 10 depicted in FIGS. 1–9. A second embodiment of the locking bar 16a is depicted in FIGS. 17 and 18 and is configured for use with the cylinder lock 10a depicted in FIGS. 10–12. Since the two embodiments of the locking bar 16/16a are similar in construction, they are discussed together below with important differences mentioned separately.

Returning to FIGS. 17–19, each locking bar 16/16a is an elongated metallic bar or rod presenting axially opposed front and rear ends 50/50a and 52/52a. The rear end 52/52a includes a transversely extending rear finger portion 54/54a, an adjoining shoulder portion 56/56a, and a hollow passageway 57/57a. As illustrated in FIGS. 8–10, when the locking bar 16/16a is placed in the cylinder plug slot 40/40a, the rear finger portion 54/54a extends from the rear end of the slot 40/40a. As illustrated in FIG. 8, the rear finger portion 54/54a remains in the lock shell notch 24/24a and prevents rotation of the cylinder plug 14/14a relative to the cylinder shell 12/12a when the keyblade 104/104a is not fully inserted in the keyway 36/36a. As illustrated in FIGS. 9 and 10, the finger portion 54/54a is shifted out of the lock shell notch 24/24a when a properly configured keyblade 104/104a is fully inserted in the keyway 36/36a.

The shoulder portion 56/56a is provided for engaging the inside face of the cylinder plug retainer cap 38/38a when the locking bar 16/16a is shifted rearward by a properly configured keyblade 104/104a. This limits the travel of the locking bar 16/16a out of the slot 40/40a and prevents the locking bar 16/16a from sliding completely out of the cylinder plug 14/14a.

Returning to FIGS. 17–19, the rear end 52/52a of the locking bar also includes a spring assembly for biasing the locking bar 16/16a forward into the slot 40/40a whenever the keyblade 104/104a is removed from the keyway 36/36a. The spring assembly includes a metal spring 60/60a and a plunger 62/62a received within the hollow chamber 57/57a formed in the rear end 52/52a of the locking bar 16/16a. As illustrated in FIG. 8, the spring assembly biases the locking bar 16/16a forward into the hollow slot 40/40a so that the rear finger portion 54/54a of the locking bar 16/16a is received within the lock shell notch 24/24a whenever a keyblade 104/104a is not fully inserted in the keyway 36. As illustrated in FIGS. 9–10, when a keyblade 104/104a is fully inserted in the keyway 36/36a, it overcomes the force of the spring 60/60a, thus shifting the rear finger portion 54/54a of the locking bar 16/16a out of the lock shell notch 24/24a.

Referring again to FIGS. 8–10, the front end 50/50a of the locking bar 16/16a extends towards the front end of the hollow slot 40/40a and it provided for engaging a protruding surface of a properly configured keyblade 104/104a placed in the keyway 36/36a as described below. When a properly configured keyblade 104/104a is placed in the keyway 36/36a, it engages the front end 50/50a of the locking bar 16/16a and shifts the locking bar 16/16a rearward in the slot 40/40a so that the rear finger portion 54/54a is shifted out of the lock shell notch 24/24a. This permits rotation of the cylinder plug 14/14a within the cylinder shell 12/12a.

The FIG. 19 embodiment of the locking bar 16 also has a front finger portion 58 at its front end 50 that extends transversely from its longitudinal axis. As illustrated in FIGS. 8 and 9, this front finger portion 58 protrudes from the side opening 41 in the hollow slot 40 into the keyway 36 for engaging a lug on the key blade 104a as described in more detail below.

The keys 100 of the present invention are best illustrated in FIGS. 13, 14 and 15 and include structure for operating the cylinder locks 10 and 10a described above. Three specific embodiments of the key 100 are illustrated in FIGS. 13–15; however, those skilled in the art will appreciate that numerous other variations of the key 100 can be formed without departing from the scope of the present invention.

Each key 100 broadly includes a bow or head 102, an elongated key blade 104 extending from one side of the bow 102, and a protruding surface 106 extending a distance from one side of the blade 104 for engaging the front end 50 of the locking bar 16 when the key 100 is inserted in the keyway 36 of the cylinder lock 10. In the FIG. 13 embodiment of the key 100, the protruding surface 106 consists of a shoulder portion that extends outwardly from one side of the key blade 104. The shoulder portion is preferably formed by milling or cutting the side of a standard key blank.

In the FIG. 14 embodiment of the key 100a, the protruding surface 106a consists of a lug portion that is stamped into one side of the key blade 104a during manufacture of the key 100a. This embodiment is preferred to the FIG. 13 embodiment because it cannot be easily copied by a locksmith by milling an existing key blank design. As illustrated, the stamped lug does not protrude beyond the normal plane of the side of the key 100a, thus it is not subject to excessive wear. The FIG. 15 embodiment of the key 100b is similar to the FIG. 14 embodiment except that the stamped lug portion protrudes beyond the normal plane of the side of the key 100b It is important to note that the length of the locking bar 16 must correspond with the precise position of the protruding surface 106 on the key 100 to open the cylinder lock 10. If the protruding surface 106 is too close to the tip of the key 100, it will prematurely engage the locking bar 16 and push it rearward until it stops on the retainer cap 38 before the key 100 properly registers at the tip-stop. This will cause the tumblers to be incorrectly aligned within the tumbler chambers and prevent key rotation. Similarly, if the protruding surface 106 is too far from the tip of the key 100, it will not engage the front end 50/50a of the locking bar 16, and the rear finger portion 54 of the locking bar 16 will remain in the cylinder shell notch 24, thus preventing cylinder plug 14 rotation.

In operation, the secondary locking structure prevents rotation of the cylinder plug 14 relative to the cylinder shell until a properly configured key 100 is fully inserted in the keyway 36. If a key 100 is cut by conventional means so that it operates the tumblers 28 of the cylinder lock 10, it will still not open the lock 10 since the locking bar 16 provides a second locking function that is independent of the tumblers 28. Additionally, since the key 100 includes novel structure for operating the cylinder lock 10, it provides a second layer of protection against unauthorized key duplication. Thus, the invention provides an increased measure of security not found in conventional cylinder locks 10.

Figure 16:
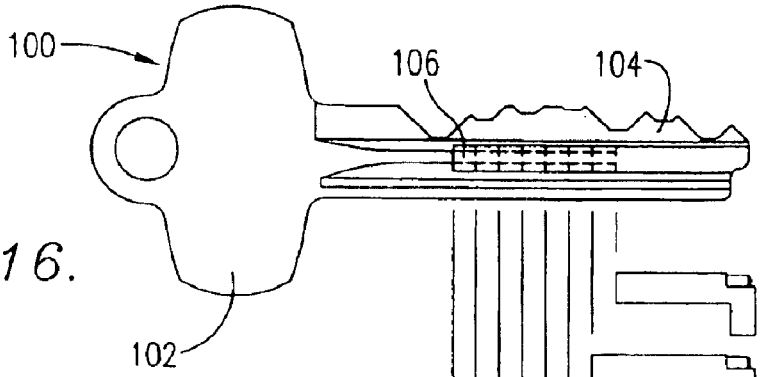
FIG. 16 is a schematic view of a key and a plurality of associated locking bars depicting the cooperation between the length of the locking bar and the positioning of protruding surface on the side of the key.

As illustrated in FIG. 16, the locking bar 16 can be formed in various lengths to provide for numerous different secondary locking options with a single keyway design. Particularly, the protruding portion 106 on the key 100 and the length of the locking bar 16 can be cooperatively varied to create a plurality of different keys for fitting a single keyway. This allows a single keyway design to be modified to provide security for various different users.

Although the invention has been described with reference to the preferred embodiment illustrated in the attached drawing figures, it is noted that equivalents may be employed and substitutions made herein without departing from the scope of the invention as recited in the claims. For example, although the invention described herein generally relates to an improvement for a standard pin tumbler cylinder, the description and illustrations of this invention are depicted in the embodiment of a special type of pin tumbler cylinder commonly known to those skilled in the art as an interchangeable core cylinder. This interchangeable core is designed with a second shear line and respectively requires a second key to turn the cylinder plug and control sleeve simultaneously, thus retracting a portion of what is known as the control sleeve allowing easy installation and removal of the cylinder in a variety of cylinder housing designs for various applications. Since this interchangeable core type of cylinder is described in the prior art, the special details of operation will not be covered here. This improvement may also be applied to conventional pin tumbler mechanisms as well as other types of tumbler mechanisms.

Having thus described the preferred embodiment of the invention, what is claimed as new and desired to be protected by Letters Patent includes the following:

1. A cylinder lock comprising:

an elongated lock shell having opposed axial front and rear ends and a hollow plug-receiving chamber extending therebetween, said rear end including a notch formed therein;

an elongated cylinder plug rotatably received within said plug-receiving chamber, said plug including opposed axial front and rear ends and a hollow keyway extending therebetween for receiving a key blade, and a hollow slot radially spaced from and extending parallel to said keyway, said slot having an opening adjacent said plug rear end, said opening being in alignment with said lock shell notch when said cylinder plug has not been rotated within said plug-receiving chamber, said slot further having a side opening in communication with said keyway; and an elongated locking bar reciprocally mounted in said hollow slot, said locking bar including a first end extending from said slot opening and normally received within said lock shell notch for preventing rotation of said cylinder plug within said plug-receiving chamber, and a second end axially opposed from said first end and including a protruding portion protruding into a portion of said keyway, wherein the insertion of a key having a protruding surface on one side thereof in said keyway [enrages] *engages* said protruding portion of said locking bar and shifts said locking bar towards said cylinder plug rear end so that said first end of said locking bar is shifted out of said notch for permitting rotation of said cylinder plug within said plug-receiving chamber.

2. The lock cylinder as set forth in claim 1, said cylinder plug further including spring means for normally biasing said locking bar first end into said shell notch.

3. The lock cylinder as set forth in claim 2, said locking bar first end including a rear finger portion extending transversely from the locking bar longitudinal axis for engaging said lock shell notch.

4. The lock cylinder as set forth in claim 2, said locking bar first end further including a shoulder portion for engaging said cylinder plug rear end when said locking bar is shifted along said slot by a key placed in said keyway for limiting the travel of said locking bar out of said hollow slot opening.

5. A key for use in combination with a cylinder lock as defined in claim 1 for operating the cylinder lock, said key comprising:

a bow; and an elongated key blade including a proximal end attached to one end of said bow, a distal end, a pair of opposed edges extending between said proximal and distal ends, and a pair of side margins interconnecting said edges, one of said side margins including a protruding surface extending therefrom for engaging the locking bar of the cylinder lock and shifting the locking bar in the slot when said key is inserted in the keyway of the cylinder lock.

6. The key as set forth in claim 5, one of said edges including a series of projections extending therefrom for operating the tumblers of the cylinder lock.

7. The cylinder lock as set forth in claim 1, said protruding portion of said second end of said locking bar comprising a front finger portion extending transversely from said slot side opening and protruding into a portion of said keyway.

8. A locking apparatus comprising:

a cylinder lock including a keyway, a [set of] *plurality of spring-biased cylinder pin* tumblers, an elongated hollow slot radially spaced from and extending parallel to the keyway and a secondary locking bar reciprocally mounted in the slot,

*said locking bar presenting a protruding portion extending transversely from the longitudinal axis of said locking bar;* and a key for operating said cylinder lock, said key including a bow, and an elongated key blade, said key blade including a proximal end attached to one end of said bow, a distal end, a pair of opposed edges extending between said proximal and distal ends, and a pair of side margins interconnecting said edges, one of said side margins including a protruding surface extending therefrom for engaging said locking bar of said cylinder lock and shifting said locking bar in said slot when said key is inserted in said keyway of said cylinder lock,

*said key protruding surface engaging said locking bar protruding portion when said key is inserted in said keyway of said cylinder lock.*

*9. The apparatus of claim 8, said bow presenting a pair of outer side margins, said protruding surface not extending beyond said bow outer side margins.*

*10. A locking apparatus comprising:*

*a cylinder lock including a keyway, a set of tumblers, an elongated hollow slot radially spaced from and extending parallel to the keyway and a secondary locking bar presenting front and rear ends reciprocally mounted in the slot,*

*said locking bar presenting a finger portion proximate the rear end thereof and extending transversely from the longitudinal axis of said locking bar, and*

*a key for operating said cylinder lock, said key including a bow, and an elongated key blade, said key blade including*

*a proximal end attached to one end of said bow,*

*a distal end,*

*a pair of opposed edges extending between said proximal and said distal ends, and*

*a pair of side margins interconnecting said edges,*

*one of said side margins including a protruding surface extending therefrom for engaging said locking bar of said cylinder lock and shifting said locking bar in said slot when said key is inserted in said keyway of said cylinder lock.*

*11. The locking apparatus of claim 10, said cylinder lock further comprising:*

*a lock shell presenting opposed front and rear ends, and*

*a cylinder plug rotatably positioned in said lock shell,*

*said lock shell having a notch formed therein proximate the rear end thereof for receiving said rear finger portion when said key is removed from said keyway.*

*12. A locking apparatus comprising:*

*a cylinder lock including a keyway, a set of tumblers, an elongated hollow slot radially spaced from and extending parallel to the keyway, a secondary locking bar reciprocally mounted in the slot, a lock shell presenting front and rear ends, a cylinder plug rotatably positioned in said lock shell, and a retainer cap secured to the cylinder plug proximate said lock shell rear end, and*

*a key for operating said cylinder lock, said key including a bow, and an elongated key blade, said key blade including*

*a proximal end attached to one end of said bow,*

*a distal end,*

*a pair of opposed edges extending between said proximal and said distal ends, and*

*a pair of side margins interconnecting said edges,*

*one of said side margins including a protruding surface extending therefrom for engaging said locking bar of said cylinder lock and shifting said locking bar in said slot when said key is inserted in said keyway of said cylinder lock,*

*said retainer cap having a notch formed therein for receiving at least a portion of said locking bar when said key is inserted in said keyway of said cylinder lock thereby permitting rotation of said cylinder plug.*

*13. A locking apparatus comprising:*

*a cylinder lock including a keyway, a plurality of spring-biased cylindrical pin tumblers, an elongated hollow slot radially spaced from and extending parallel to the keyway and a secondary locking bar reciprocally mounted in the slot,*

*said secondary locking bar presenting a pair of sidewall sections substantially parallel to the longitudinal axis of said locking bar; and*

*a key for operating said cylinder lock, said key including a bow, and an elongated key blade, said key blade including*

*a proximal end attached to one end of said bow,*

*a distal end,*

*a pair of opposed edges extending between said proximal and distal ends, and a pair of side margins interconnecting said edges,*

*one of said side margins including a protruding surface extending therefrom for engaging said locking bar of said cylinder lock and shifting said locking bar in said slot when said key is inserted in said keyway of said cylinder lock,*

*said locking bar presenting a protruding portion extending transversely from the longitudinal axis of said locking bar.*

*14. A key for use in combination with a cylinder lock as defined in claim 1 for operating the cylinder lock, said key comprising:*

*a bow presenting a pair of outer side margins; and*

*an elongated key blade including*

*a proximal end attached to one end of said bow,*

*a distal end,*

*a pair of opposed edges extending between said proximal and distal ends, and*

*a pair of side margins interconnecting said edges,*

*one of said side margins including a protruding surface extending therefrom for engaging the locking bar of the cylinder lock and shifting the locking bar in the slot when said key is inserted in the keyway of the cylinder lock,*

*said protruding surface not extending beyond said bow outer side margins.*

*15. A locking apparatus comprising:*

*a cylinder lock including a keyway, a plurality of spring-biased cylindrical pin tumblers, an elongated hollow slot radially spaced from and extending parallel to the keyway and a secondary locking bar reciprocally mounted in the slot; and*

*a key for operating said cylinder lock, said key including a bow, and an elongated key blade, the key blade including:*

*a proximal end attached to one end of said bow,*

*a distal end,*

*a pair of opposed edges extending between said proximal and distal ends, and a pair of side margins interconnecting said edges,*

*one of said side margins including a protruding surface extending therefrom for engaging said locking bar of said cylinder lock and shifting said locking bar in said slot when said key is inserted in said keyway of said cylinder lock,*

*said bow presenting a pair of outer side margins,*

*said protruding surface not extending beyond said bow outer side margins.*

*16. The key of claim 15, said protruding surface being spaced from said bow.*

*17. The key of claim 15, the distance between said key blade side margins being less than the distance between said bow outer side margins.*

* * * * *